July 20, 1965 J. M. REYNARD 3,195,707

KEYLEVER SIGNAL STORING MECHANISM

Filed July 16, 1962 6 Sheets-Sheet 1

INVENTOR
JOHN M. REYNARD

BY Thomas S. Ross
James L. Black Jr.
ATTORNEYS

INVENTOR
JOHN M. REYNARD
BY Thomas S. Ross
James L. Black Jr.
ATTORNEYS

July 20, 1965 J. M. REYNARD 3,195,707

KEYLEVER SIGNAL STORING MECHANISM

Filed July 16, 1962

6 Sheets-Sheet 3

INVENTOR
JOHN M. REYNARD

BY Thomas S. Ross
James L. Black Jr.
ATTORNEYS

INVENTOR
JOHN M. REYNARD
BY Thomas S. Ross
James L. Black Jr.
ATTORNEYS

INVENTOR
JOHN M. REYNARD
BY Thomas S. Ross
James L. Black Jr.
ATTORNEYS

KEYLEVER SIGNAL STORING MECHANISM

Filed July 16, 1962

INVENTOR
JOHN M. REYNARD
BY Thomas S. Ross
James L. Black Jr.
ATTORNEYS

United States Patent Office 3,195,707

Patented July 20, 1965

3,195,707

KEYLEVER SIGNAL STORING MECHANISM

John M. Reynard, Tariffville, Conn., assignor to Royal McBee Corporation, New York, N.Y., a corporation of New York Filed July 16, 1962, Ser. No. 209,869
19 Claims. (Cl. 197—16)

This invention relates to an improved keyboard mechanism for an electric writing machine of the matrix type such as disclosed, for example, in U.S. Patent 2,879,876.

The end product of any writing machine is the copy it produces. It is accordingly highly desirable for the machine to be capable of producing copy of high definition, uniform density and proper letter spacing at a high rate of speed. Inasmuch as the keyboard is the primary control of the entire machine, i.e. the input portion thereof, it should function in response to the typist's manipulations with a high degree of precision and celerity and at the same time be so arranged as to preclude any possibility of jamming, overstriking, blurring and any other factor that might adversely affect the quality of the copy as a result of improper or inadvertent operation. It is, accordingly, an object of this invention to provide a keyboard mechanism that is so interlocked as to be foolproof in operation.

Mechanisms of the nature here under consideration that are in current commercial use have various shortcomings that occasionally give rise to conditions that require service calls for operational maintenance. For example, when such a typewriter is operated by a highly skilled typist who is capable of typing up to ten characters per second, jamming or blanking may occur, the former sometimes occasioning repair service and the latter resulting in inferior quality copy. Also there occasionally occurs what is somtimes referred to as "flicking," i.e. the typist inadvertently flicks or lightly touches a key causing an undesired printing operation. It is another object of this invention to provide a keyboard mechanism that will not respond to such flicking.

In order to utilize the full printing capacity, i.e. up to twenty characters per second, of a machine of this character it is necessary to provide for the initiation of a second cycle of operation, either character or word spacing, during the preceding cycle. In other words, after an alpha numerical key has been depressed to signal for encoding, decoding, printing and escapement, it must be possible to depress another key or the space bar within a few milliseconds after the preceding key has been depressed and store the second signal until the preceding cycle has been completed whereupon the stored signal automatically initiates another cycle. Mechanisms to effect this storage function have been provided heretofore but have been subject to operational shortcomings that sometimes make them less than satisfactory and not infrequently subject to excessive servicing. It is accordingly a still further object of this invention to provide a simple, inexpensive and trustworthy storage mechanism that obviates such disadvantages.

Other objects will be in part apparent and in part pointed out in the following description and illustrated in the accompanying drawings wherein a preferred embodiment of the invention is disclosed and wherein similar reference characters refer to similar parts throughout the several views.

Figure 1:
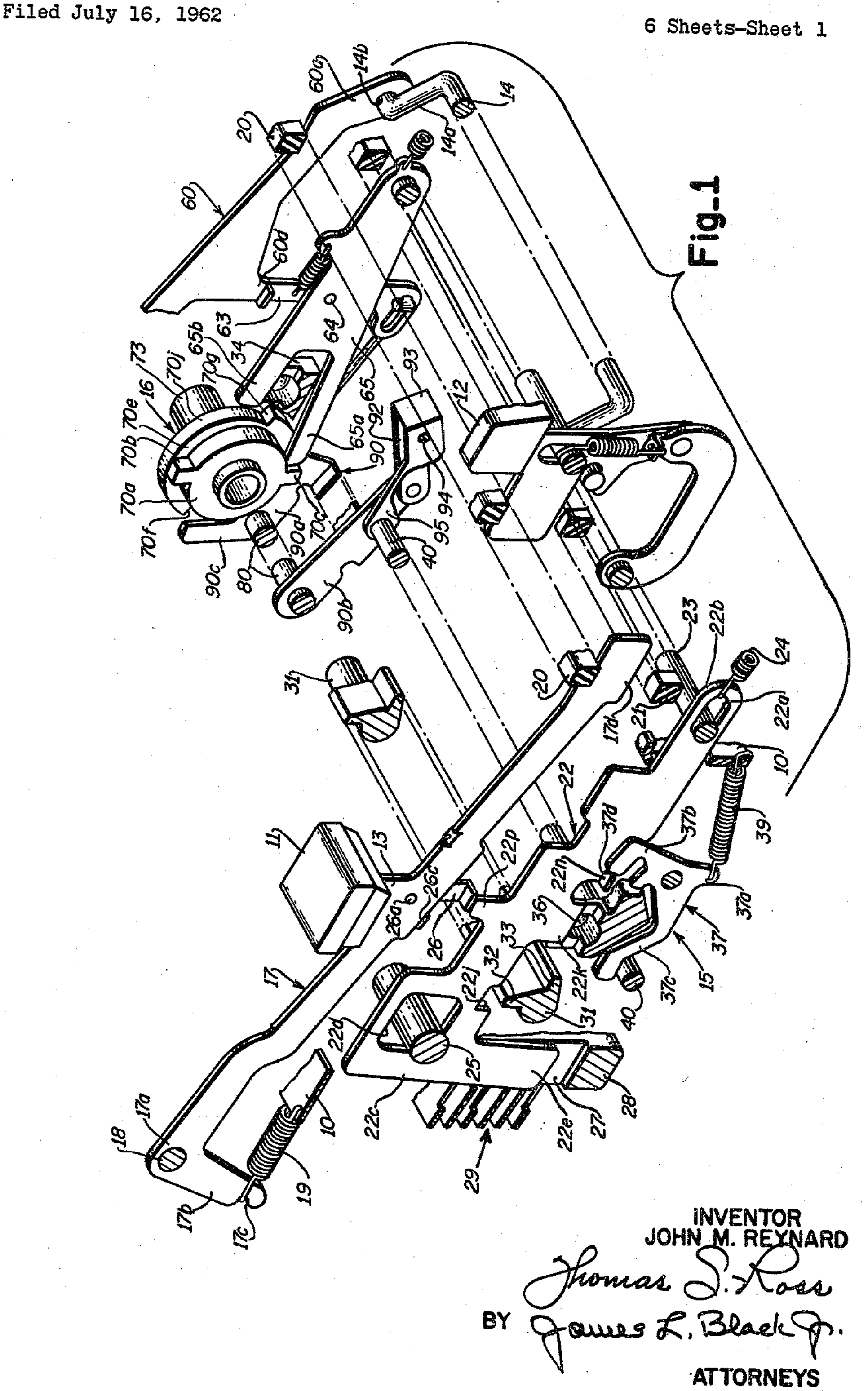
FIGURE 1 is a fragmentary, exploded isometric view of a portion of the keyboard showing one type key and the space bar with their associated mechanisms in normal or idle condition.

In a machine of the aforementioned type a key depressed interposer is required to effect clutch engagement thereby to initiate a machine cycle and thereafter to be driven during the machine cycle to generate a code corresponding to the key depressed. In order that it may be driven after initiating a cycle it must remain in its depressed state should the key causing its depression be released prior to its being driven. It has accordingly been proposed to latch the interposer in its depressed condition. On one hand, bearing in mind that the writing machine has a multiplicity of actions, e.g. forty-five in an electric typewriter, it is obviously impossible to so nicely adjust all of the actions that the two stated conditions, i.e. clutch engagement and latching, can occur simultaneously; therefore the actions are so adjusted that but one of the conditions, e.g. clutch engagement, occurs first. Thus if adjustment is made so that clutch activation occurs first, a manipulation known as "flicking" can evoke an improper code. In other words, if a key is depressed lightly but rapidly, the interposer is not sufficiently depressed to latch into storage condition but is depressed enough to trigger the clutch. When the finger is removed from the key and its returns to normal position, the interposer will follow the key upwardly and the driver will either miss the interposer entirely, thus giving a zero code, or will partially drive the interposer so that a bastard code results. On the other hand, if the interposer latch is adjusted to trap the interposer prior to clutch triggering, a condition known as jamming can occur. In this case if the key is depressed partially the interposer goes into latch or storage condition but the clutch does not engage. When the finger is removed from the keyboard the key returns to normal, but the interposer does not, since it is still in storage and the keyboard is consequently jammed or locked except for the key in storage. If the average typist does not know how to free the jam a service call is required. Even where a typist knows how to free the jam, she may not remember the last character key depressed or the key depressed may have the wrong character. Either case is time consuming.

In accordance with one important aspect of the present invention, the machine cannot respond to flicking. Thus in the herein disclosed keyboard, a key lever is pivotally mounted on the machine frame over an interposer that is capable of pivotal and lateral linear motion, the interposer being pivoted downwardly upon depression of a key lever. Underlying the interposer is a spring biased pivotable latching and clutch bar actuating storage pawl that traps the interposer at a predetermined minimum amount of downward interposer movement and at the same time depresses the clutch bar to engage a clutch and cause rotation of an interposer driver. As the interposer is held in depressed position it will be engaged and driven to set the appropriate encoding bail or bails. Thus flicking cannot result in clutch actuating movement of the pawl and accordingly no encoding response is possible. In other words, less than the minimum downward interposer movement will not be responded to, hence there can be no creation of a bastard code or jamming of the mechanism.

Throughout the several figures of the drawing, various portions of the machine frame are shown and these portions will hereinafter be commonly designated frame 10. Also the following description will be confined to the mechanisms responding to depression of the alpha-numerical keys and the space bar.

Figure 3:
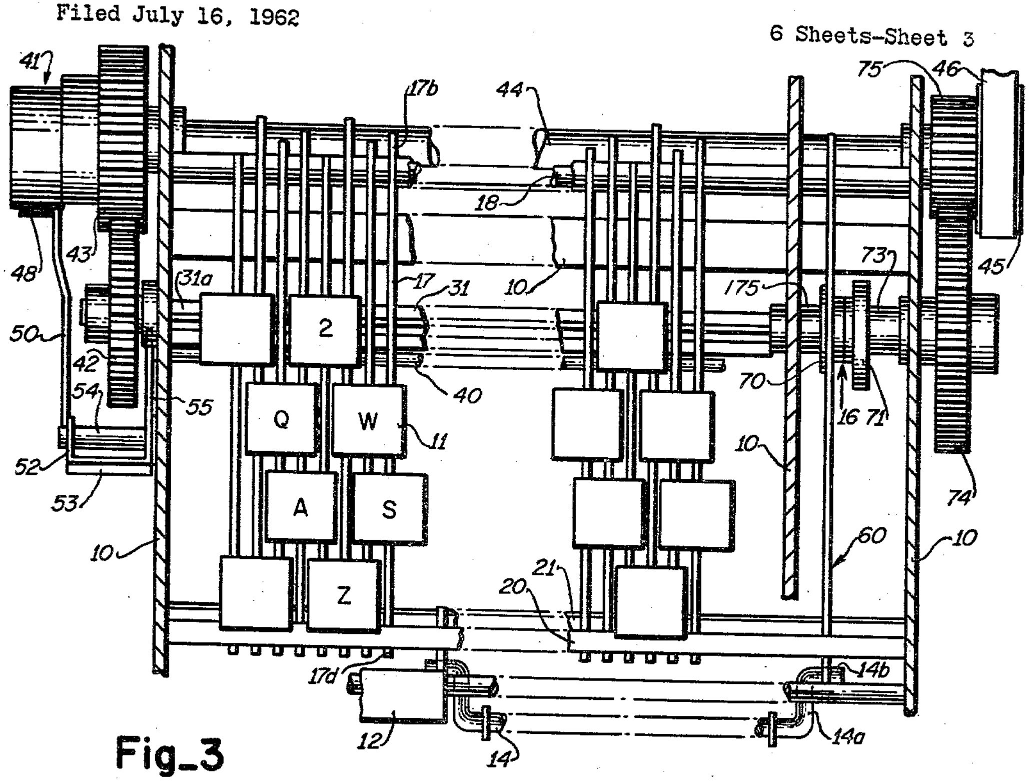
FIGURE 3 is a plan view of the keyboard drive.

Referring first to FIGURES 1 and 3, the keyboard is provided with the usual complement of alpha-numerical keys 11 and space bar 12, the former being mounted on stems 13 and the latter being connected in conventional manner to a pivot bar 14 suitably mounted on frame 10. An alpha numeric mechanism, generally indicated at 15, responds to depression of key 11, there being such a mechanism for each of the keys; a space clutch mechanism, generally indicated at 16, responds to depression of space bar 12 to effect operation of an escapement mechanism (not shown) to effect word spacing, the alpha numeric mechanisms 15 and the space clutch mechanism 16 being interlocked, in a manner to be described, in order to provide memory or storage of a space bar signal.

Key stem 13 is preferably integral with a key lever 17 whose inner end **17*a* is pivotally mounted on a fulcrum 18 which extends across the machine and is suitably secured to frame 10. Lever 17 includes a tail 17*b*, notched as at 17*c* to receive one end of a spring 19 the other end of which is anchored to frame 10. This spring biases lever 17 counterclockwise, the pivotal movement of the lever being limited by upper and lower stops 20 and 21 respectively mounted on frame 10 (see FIGURE 4). Thus depression of key 11 pivots lever 17 clockwise until its outer end 17*d* engages lower stop 21**.

As shown in FIGURE 1, an interposer generally indicated at 22 is disposed directly beneath each of key levers 17, is coplanar therewith and is pivotally supported by a frame supported fulcrum 23 which extends through a slot **22*a* formed in its outer end 22*b*. A spring 24 has one end secured to the interposer end 22*b*, the other end of the spring being secured to frame 10 in such a manner that interposer 22 is biased to the right and clockwise as viewed in FIGURES 1 and 4. The other or inner end 22*c* of interposer 22 is provided with an aperture 22*d* which may be substantially square and through which extends a stop bar 25 suitably secured to frame 10** and which limits the arcuate and linear movements of the interposer as will be described in detail hereinbelow.

Interposer 22 includes a post **22*p* which underlies and is normally slightly spaced from the bottom of a conventional by-pass arm 26 pivotally secured to lever 17 by a pin 26*a* and biased clockwise by a spring 26*b* secured at its opposite ends to the arm and lever respectively, the arm having a lip 26*c* which engages the bottom edge of lever 17 to limit its clockwise movement. Thus when key 11 is depressed the bottom of arm 26 engages the top of post 22*p* and rocks interposer counterclockwise about its fulcrum 23 and against the bias of spring 24 to the FIGURE 4A position, this movement being limited by stop bar 25. It should be noted that the bias of spring 24 is sufficient to hold interposer 22 in its normal position (FIGURE 4) against stop 25 in opposition to the force of a pawl biasing spring 39 acting through the nose 37*b* of a pawl 37 against interposer finger 22*n*. Further, if a key is depressed just short of latching and is then released, the spring 24 is strong enough to overcome the friction force between surface 37*d* of pawl 37 and finger 22*n*** thereby to return the interposer to its normal position.

Interposer 22 includes a downwardly extending bail engaging blade **22*e* at its inner end that is arranged to slide up and down in a guide slot 27 formed in a comb 28 secured to the machine frame. When in its down position (FIGURE 4A) blade 22*e* is in place to subsequently engage one or more of a group of permutation bails 29, pivotally mounted on a fulcrum 30 secured to frame 10, to thereby generate a code corresponding to depressed key 11. It will also be seen that when the interposer is in the FIGURE 4A position the upper edge of its opening 22*d* engages the top of stop bar 25** thus to prevent further downward movement of the interposer.

Figure 4:
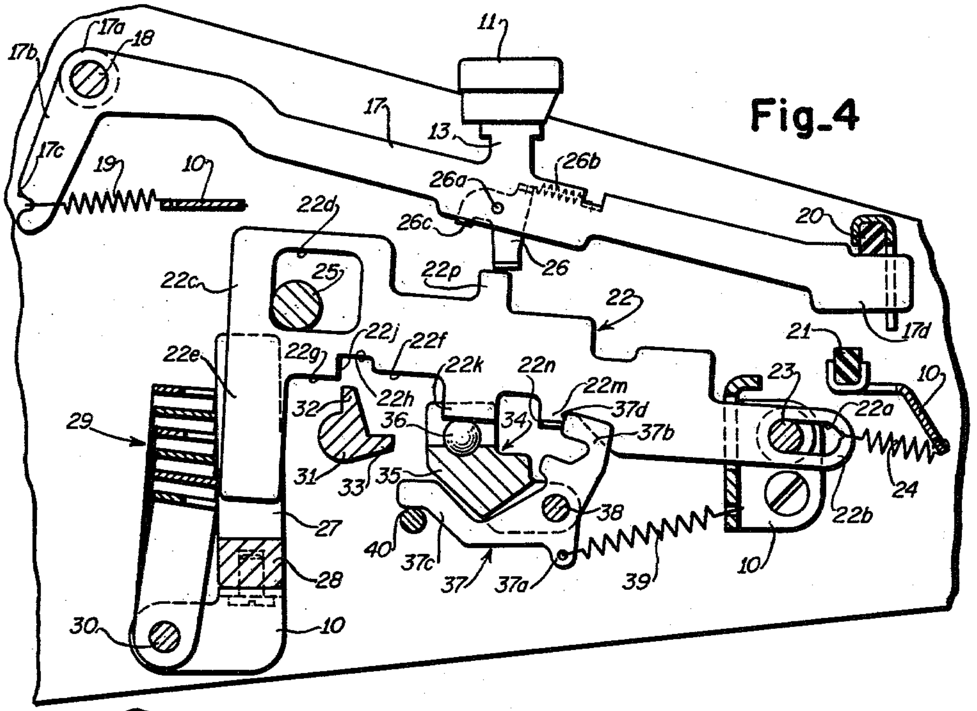
FIGURE 4 is a side elevation partially in section of the keyboard in normal condition.

As shown in FIGURE 4, interposer 22 has a pair of lower surfaces **22*f* and 22*g* that lie in spaced parallel planes, one above the other respectively, and are separated by a notch 22*h* that provides an abutment surface 22*j*. A driver 31 is rotatably mounted on frame 10 below interposer abutment 22*j* and is provided with a pair of abutters 32 and 33 that are angularly spaced 90 degrees. It will now appear that when interposer 22 is pivoted to its FIGURE 4A position by depression of lever 17, its abutment 22*j* is moved into the path of abutter 32 which, upon rotation of driver 31, drives interposer 22 linearly to the left against the bias of spring 24, thus to pivot appropriate bails 29 as shown in FIGURE 4B and accordingly generate a code corresponding to the depressed key lever 17. Continued rotation of driver 31 results in its abutter 33 engaging interposer surface 22*f* which drives the interposer upwardly so that spring 24** can return it to its FIGURE 4 position. Thus the interposer is positively returned to normal position at exactly the correct time in the cycle of operation.

Figure 4A:
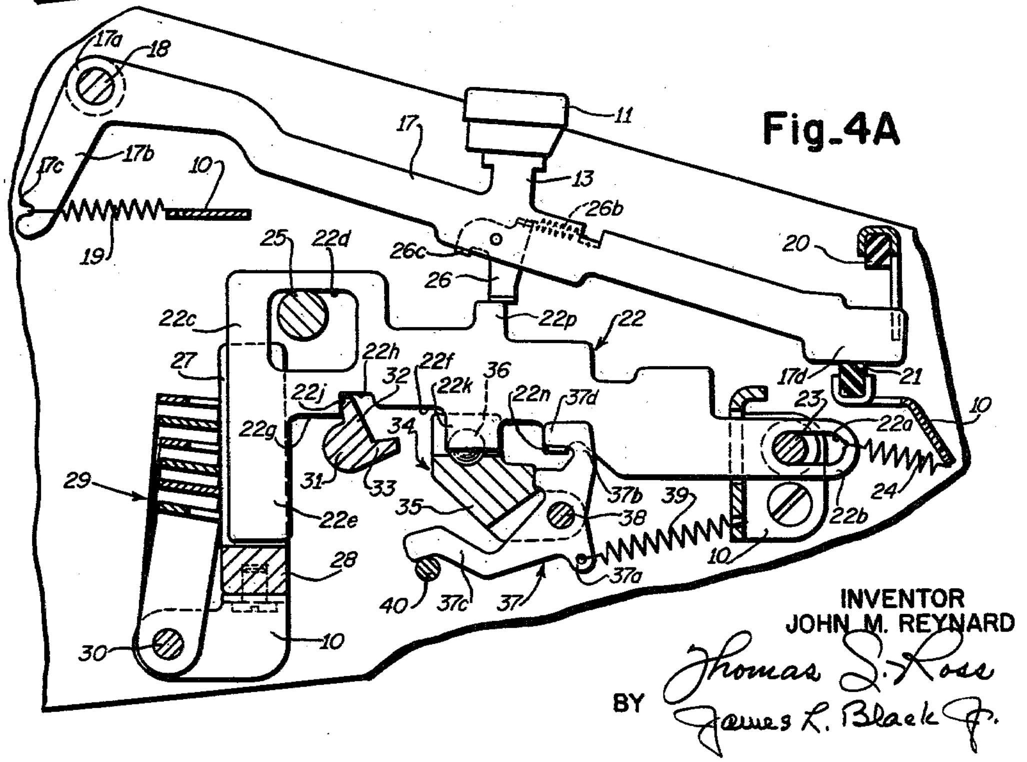
FIGURE 4A is a first active view similar to FIGURE 4 but showing the condition of the mechanism after a key has been depressed.
Figure 4B:
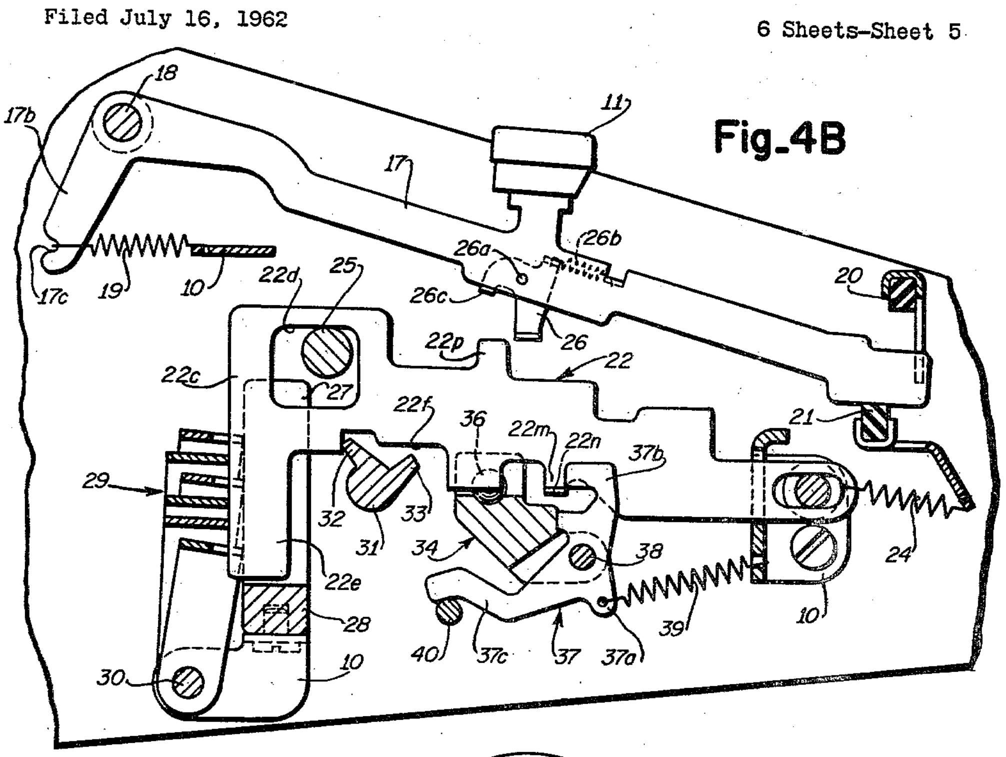
FIGURE 4B is a second active view showing an interposer being driven to encoding position.

Interposer 22 includes a depending locking blade **22*k* that is adapted, on downward movement of the interposer to its FIGURE 4A position, to enter a ball lock generally indicated at 34. This ball lock comprises a trough and blade guide 35 secured at its ends to frame 10 and a complement of balls 36, any two adjacent balls being capable of lateral separation by an amount slightly greater than the thickness of interposer blade 22*k*. Thus when one interposer 22 is depressed to the FIGURE 4A position, balls 36 effectively lock out any other interposer until the depressed interposer leaves the ball lock. Accordingly it is impossible to depress another key 11 until the printing cycle initiated by a preceding key depression has passed the FIGURE 4B condition. It follows that ball lock 34** constitutes a simple and efficient interlock mechanism for the machine.

Figure 4C:
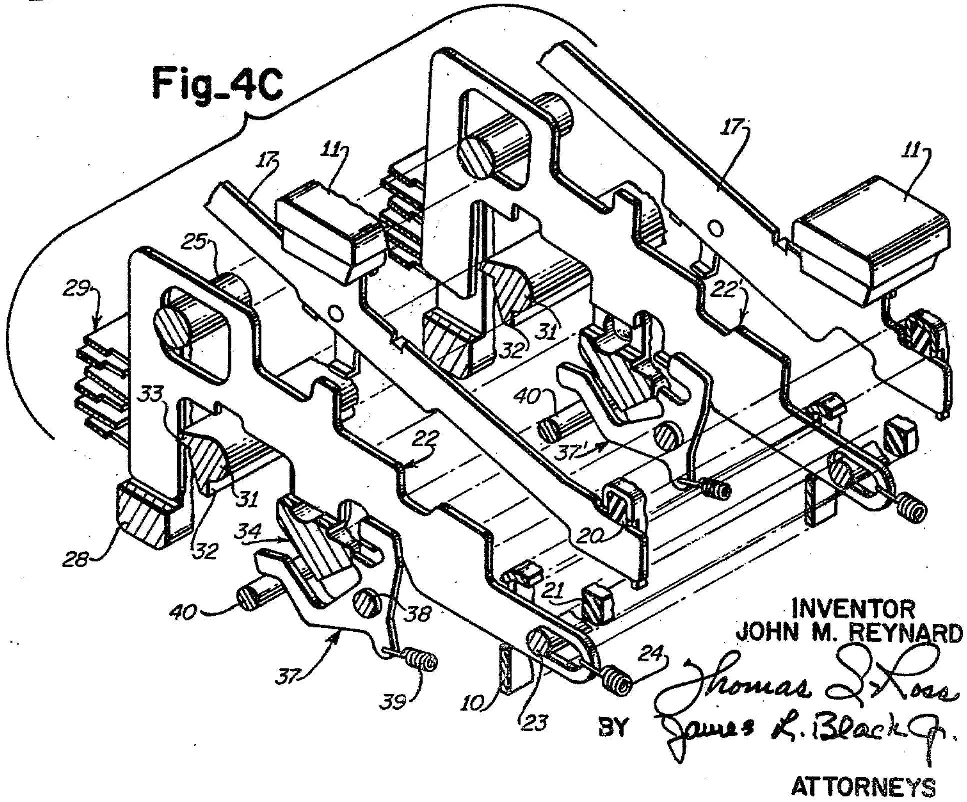
FIGURE 4C is an active isometric view showing one key and its interposer returning to normal position and another interposer locked in storage position.
Figure 5:
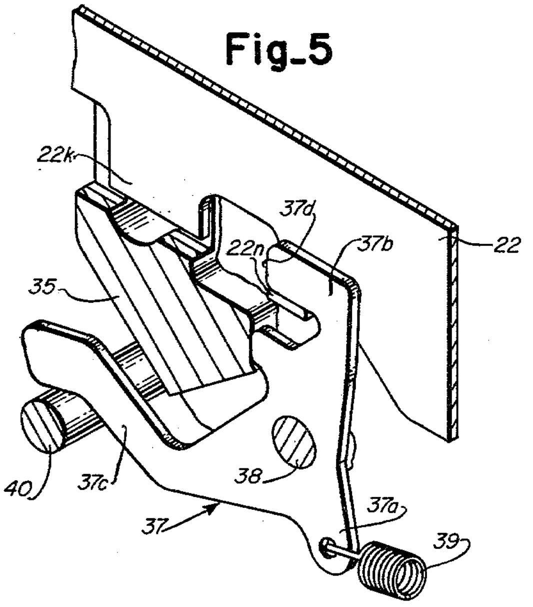
FIGURE 5 is an enlarged fragmentary isometric view of an interposer in storage position.

As shown in FIGURES 4, 4*c* and 5 interposer 22 includes a downwardly extending arm **22*m* having a laterally extending finger 22*n* adapted to coact with a latching and clutch actuating storage pawl generally indicated at 37, there being a similar pawl for each of the interposers. Pawl 37 is pivotally mounted on a fulcrum 38 mounted on the ball lock trough 35. Pawl 37 includes an ear 37*a* to which one end of a spring 39 is attached, the other end of this spring being secured to frame 10 thus to bias the pawl counterclockwise as viewed in FIGURE 5. Pawl 37 includes a latching arm 37*b* and a clutch bar actuating foot 37*c* adapted to engage and depress a clutch activating bar 40. Pawl arm 37*b* has a nose 37*d* which bears against interposer finger 22*n* when the parts are in their normal or inactive position (FIGURE 4) thus holding pawl 37 in its unlatching position against the pull of spring 39. When interposer 22 is depressed to its FIGURE 5 position, its finger 22*n* clears latching arm 37*b* of the pawl permitting the pawl to pivot counterclockwise so that arm 37*b* rides over and traps finger 22*n* thus holding the interposer in depressed position where it can be engaged and driven by driver 31 as described above. Such pivotal movement of pawl 37 by spring 39 also forces its foot 37*c* downwardly against clutch activating bar 40 to move the bar downwardly to trip a wrap spring clutch generally indicated at 41** in FIGURE 3. When this clutch is tripped driver 31 is rotated to effect a cycle of operation through a drive system described hereinbelow.

From the foregoing it may be seen that in order for spring 39 to pivot pawl 37 to effect clutch operation and initiate a cycle of operation, a predetermined minimum of downward movement of interposer 22 is necessary. Less than such amount of movement as might result from the typist merely flicking a key will evoke no response. Accordingly, inadvertent or improper key manipulation cannot result in production of a bastard code or jamming of any of the mechanisms comprising the machine.

Figure 6:
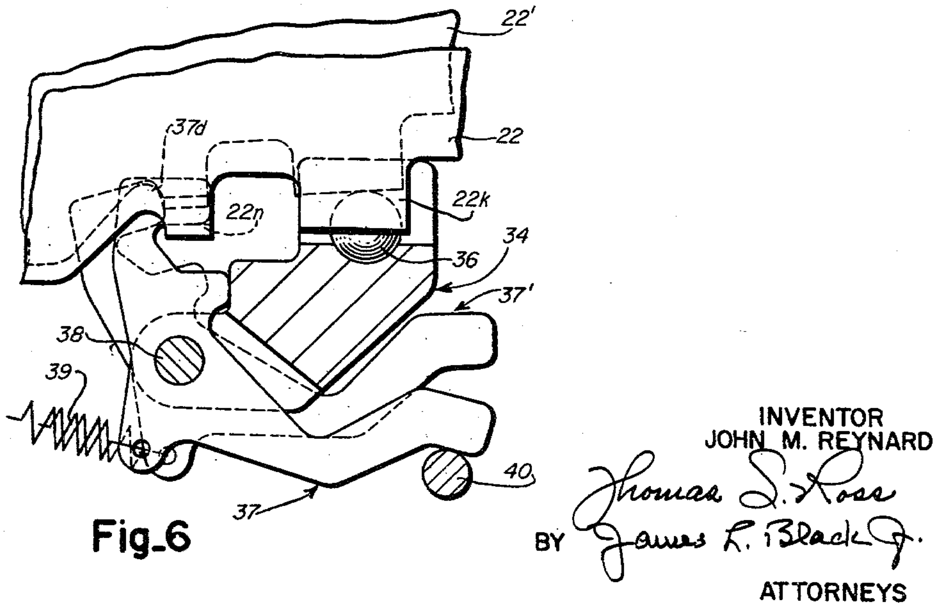
FIGURE 6 is an enlarged fragmentary sectional elevation showing one interposer in normal position and another in storage.

Pawl 37 also serves another important purpose. In order for the machine to produce copy up to its capacity it is necessary that the machine be able to store or latch an interposer depressed during a cycle of operation initiated by a first depressed interposer such that it may initiate a cycle immediately after the first initiated cycle. In other words, a skilled typist may depress a key lever before a cycle of operation initiated by a preceding key lever depression has been completed. In FIGURES 4C and 6 two interposers 22 and 22′ and their associated storage pawls 37 and 37′ are shown. Interposer 22′ has been depressed to initiate a cycle of operation which has progressed to the point where driver abutter 33 is returning the interposer to its normal position, i.e. the FIGURE 4 position. This portion of the cycle takes about 12.5 milliseconds and leaves the keyboard in a condition wherein another key 11 can be depressed and its signal stored until the cycle has been completed. Accordingly depression of such other key 11, as shown in FIGURES 4C and 6 has depressed its interposer 22 permitting its storage pawl 37 to rock counterclockwise to trap the interposer in its depressed position and move clutch bar 40 downwardly and hold it there. When the cycle of operation has been completed in a matter of 50 milliseconds the interposer 22 and clutch bar 40 are in position for automatically encoding the stored signal, i.e. driver 31 engages interposer 22 as heretofore described (see FIGURE 4B) to pivot appropriate bails 29 and thereafter return the interposer to its normal position and release pawl 37 from its storage position. Thus it may be seen that the foregoing provides an extremely simple and efficient key signal storage system.

Figure 3A:
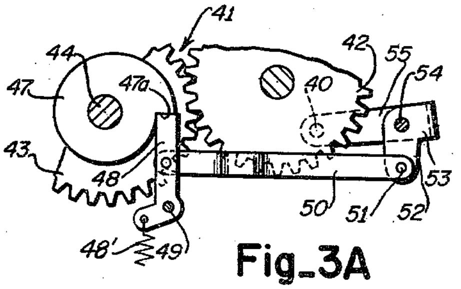
FIGURE 3A is a side elevation of the main clutch.

The drive mechanism for operating driver 31 is best shown in FIGURES 3 and 3A. Thus end 31*a* of the driver 31 is rotatably mounted on and extends through frame 10 and has a gear 42 secured thereto. This gear meshes with a gear 43 rotatably mounted on one end of a shaft 44 journaled on the frame. The other end of this shaft carries a pulley 45 for a belt 46 connected to a motor driven pulley (not shown) whereby the shaft is constantly rotated when the motor (not shown) is energized. Gear 43 comprises one element of wrap spring clutch 41, the other element of which comprises a cam 47 rotatably mounted on shaft 44 and having a stop 47*a* which, when in engagement with a pivotable stop arm 48, normally biased toward the cam periphery as by a spring 48′, disengages clutch 41 by radially expanding the clutch wrap spring away from shaft 44. Arm 48 is pivotally connected to the machine frame by a pin 49 and has pivotally connected thereto one end of a link 50. The other end of link 50 is connected by a pin 51 to one arm 52 of a bell crank 53 rockably mounted on a shaft 54 secured to frame 10. The other arm 55 of bell crank 53 is secured to clutch bar 40. It will now appear that downward movement of clutch bar 40 as described above rocks bell crank 53 counterclockwise (FIGURE 3A) thus pulling link 50 to the right to rock arm 48 clockwise to disengage it from stop 47*a*. This effects engagement of clutch 41 and consequent rotation of driver 31 through one revolution unless arm 48 is held away from stop 47*a* as it is when an interposer 22 is held in storage position as described above. In the absence of the storage condition, arm 48 is released by pawl foot 37*c* after about 12.5 milliseconds of the cycle and is biased counterclockwise in any suitable manner as by spring 48′ so as to ride against the surface of cam 47 until it is re-engaged by stop 47*a* to disengage clutch 41 at the end of the cycle. As a cycle of operation is of about 50 milliseconds duration it will appear that the machine is capable of twenty cycle per second, many more than even the most skillful typist can initiate.

In view of the fact that the space bar on a writing machine is characterized by a frequency of operation greater than any alpha-numerical key it is important that it be provided with a reliable and sturdy storage system capable of high speed response and so interlocked with the alpha-numerical systems as to be foolproof in operation.

Thus in accordance with another aspect of the invention it is possible to depress an alpha-numerical key lever and store the signal during a spacing cycle but the printing cycle will not begin until the spacing cycle is completed. Also if, after an alpha-numerical key has been depressed to initiate a printing cycle and the space bar is depressed before completion of the printing cycle, the space bar signal will be stored for use at the end of the printing cycle. The mechanisms for effecting these operations are so interlocked that the two different cycles cannot overlap.

Figures 2, 2A, 2B:
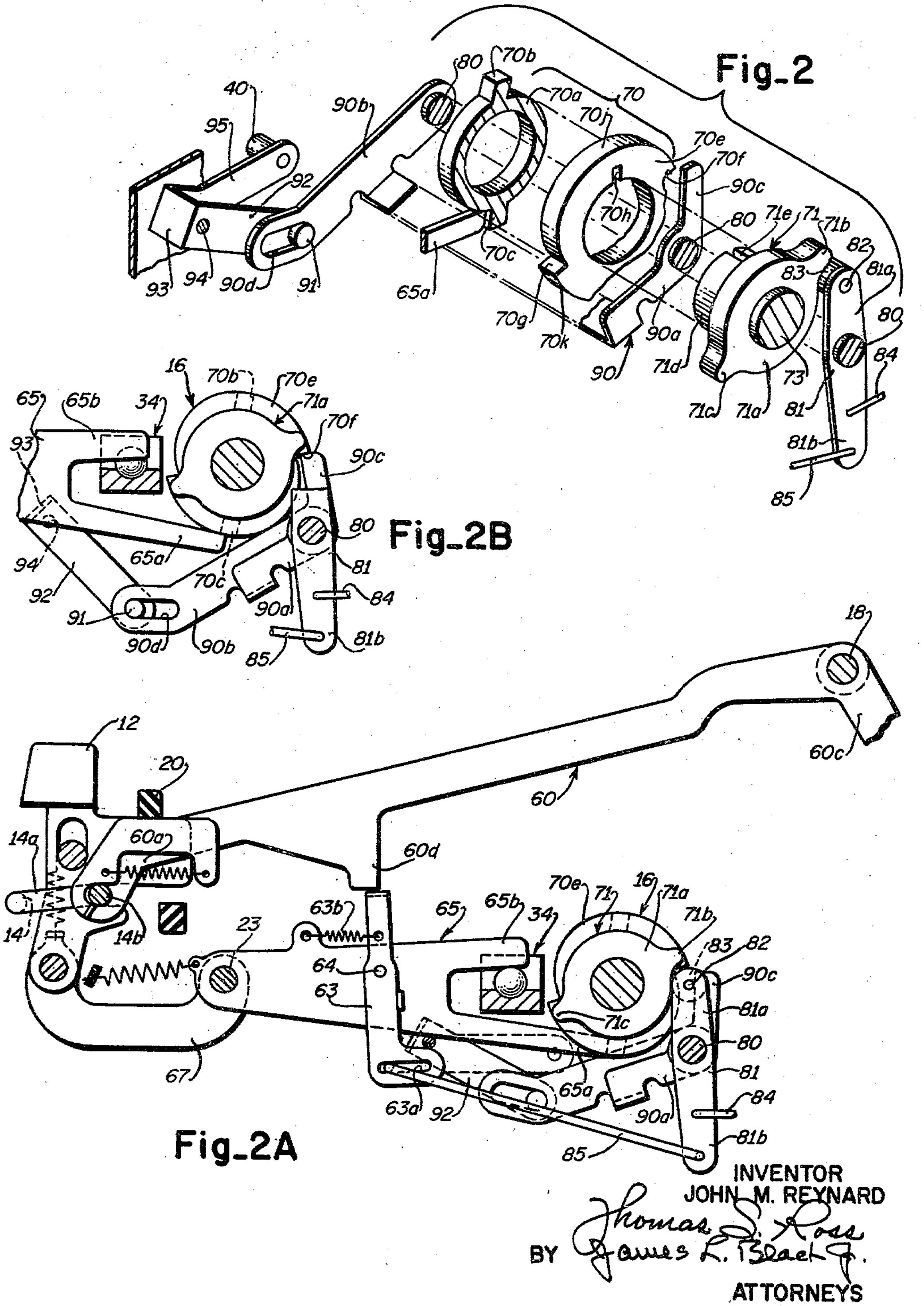
FIGURE 2 is an exploded isometric view of the space bar clutch mechanism and interlock.
FIGURE 2A is a side elevation of the space bar and related mechanisms.
FIGURE 2B is a fragmentary elevation of a portion of the mechanism showing a space bar signal in storage.

As mentioned above with reference to FIGURE 1 the keyboard includes space bar 12 secured in the manner shown in FIGURE 2A to pivot bar 14, the parts being so mounted on frame 10 that depression of space bar 12 causes counterclockwise pivotal movement of bar 14. The right hand end of bar 14 is provided with a crank arm 14*a* (see also FIGURE 2A) having an outwardly turned end 14*b* that is pivotally received in the outer end 60*a* of a space bar lever generally indicated at 60. This lever is pivotally mounted on fulcrum bar 18. Lever 60 also includes a return arm 60*c* to which a frame anchored spring similar to spring 19 is fastened to impart a clockwise return bias to lever 60 and the several elements serially connected thereto.

A foot 60*d* integrally depends from lever 60 and overlies a conventional by-pass arm 63 pivotally secured by a pin 64 to an interposer generally indicated at 65. This interposer is pivotally connected, by fulcrum 23, to frame 10 and includes a clutch control finger 65*a* and a ball lock blade 65*b*, the latter being adapted to enter ball lock 34 when the interposer is depressed. Thus the inner end of interposer 65 is, in effect, bifurcated so that fingers 65*a* and 65*b* straddle ball lock 34.

Figure 3B:
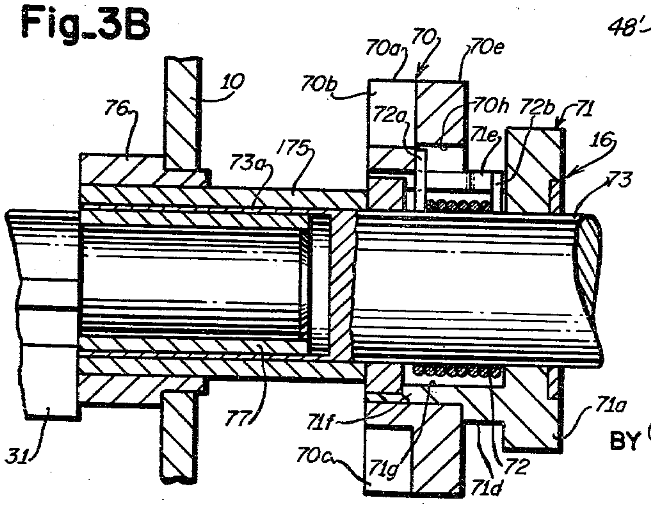
FIGURE 3B is an enlarged sectional elevation of the space bar mechanism clutch.

Clutch 16, FIGURES 2, 2A and 3B is of the wrap spring type and comprises two elements 70 and 71 interconnected by a wrap spring 72, the two elements and the spring being rotatably mounted on a constantly rotating stud shaft 73 having a gear 74 (FIGURE 3) secured on its outer end. Gear 74 meshes with a gear 75 which is mounted on the constantly rotating shaft 44 inside of pulley 45 and the diameter of which is one half that of gear 74. Shaft 44 is adapted to rotate at the rate of 1200 r.p.m.; accordingly gear 74 rotates at 600 r.p.m. to drive shaft 73 at the same speed.

As shown in FIGURE 3B the inner end 73*a* of shaft 73 is hollowed out and is rotatably received in a journal bearing 175 mounted in a bushing 76 secured to frame 10. The hollow end 73*a* of shaft 73 receives a sleeve bearing 77 which journals the right hand end of driver 31. Thus driver 31 may operate cyclically as described above, while shaft 73 rotates constantly.

As shown in FIGURES 2 and 3B clutch element 70 includes an abutting member 70*a* having two abutments or stops 70*b* and 70*c* which are angularly spaced 180 degrees. Clutch element 70 also includes a stop member 70*e* which is integral with or secured to member 70*a* and has two stops 70*f* and 70*g*, angularly spaced 180 degrees, and a cut out 70*h* into which one end 72*a* of wrap spring 72 extends. Stop 70*f* is the terminus of a cam surface 70*j* which starts at stop 70*g* while stop 70*g* is the terminus of a cam surface 70k which starts at stop 70f, these stops and cam surfaces being provided for a purpose to be described below.

Clutch element 71, FIGURES 2 and 2A comprises a disc 71a having two lobes 71b and 71c formed thereon, 180 degrees apart, and a hub 71d slotted as at 71e to receive the other end 72b (FIGURE 3b) of wrap spring 72. Lobes 71b and 71c (FIGURE 2) are axially aligned with stops 70f and 70g respectively. As shown in FIGURE 3B hub 71d has a reduced end 71f on which clutch element 70 is freely mounted, the two clutch elements 70 and 71 being held in proper relative operative position on shaft 73 by the ends of wrap spring 72. It should also be noted that hub 71d has an enlarged bore 71g in which wrap spring 72, which has a normal diametral dimension less than that of shaft 73, is disposed when the clutch elements are assembled. It may now be seen that when interposer stop arm 65a is in its FIGURE 2 position, one or the other of stops 70b and 70c (stop 70c as shown) bears against the end of the stop arm thus holding clutch 16 in disengaged condition through the action of slot 70h, which is relatively narrower than the underlying portion of slot 71e, against the end of the wrap spring; said underlying portion of slot 71e being wider than slot 70h to the extent necessary to enable clutch engagement and disengagement as will be understood by those conversant in the art. When, however, interposer 65 is pivoted downwardly by depression of the space bar as described above, stop arm 65a is rocked downwardly away from stop 70c permitting slight relative movement between clutch elements 70 and 71 under the bias of wrap spring 72 so that the spring can clutch shaft 73 in the well known manner causing the shaft to drive the two clutch elements 70 and 71, the latter operating the escapement mechanism (not shown) of the machine to effect a spacing operation as will now be described.

As shown in FIGURES 2 and 2A the machine frame supports a transverse fulcrum bar 80 which pivotally carries a lever 81. The upper arm 81a of this lever has secured thereto a pin 82 on which a roller 83 is rotatably mounted, this roller being biased against the surface of clutch element 71 so as to be engaged by lobes 71b and 71c upon rotation of element 71. When the roller is so engaged by a lobe, lever 81 is rocked clockwise about its fulcrum 80. Lever 81 includes a lower arm 81b to which is pivotally connected a link 84, this link being connected to the escapement mechanism (not shown) of the machine in such a manner as to effect a spacing operation when lever 81 is rocked by lobe 71b, for example, as described. The lower end of lever arm 81b has pivotally connected thereto one end of a link 85 the other end of which is pivotally mounted in a slot 63a formed in the lower end of by-pass lever 63 which provides a lost motion connection between the link and lever.

It follows that when lever 81 is rocked clockwise as a result of depression of space bar lever 60; it will, through link 85, rock by-pass lever 63 to its by-pass position to the right (FIGURE 2A) of lever foot 60d. By reason of the said lost motion connection, return of lever 81 will not affect the by-pass lever, return thereof to operative position beneath lever foot 60d being effected by a spring 63b connected to lever 63 and interposer 65.

The mechanism whereby a space bar action may be stored will now be described with reference primarily to FIGURES 1, 2 and 2A. Fulcrum bar 80 pivotally supports a bail, generally indicated at 90, comprising a pair of spaced arms 90a and 90b through which fulcrum bar 80 extends and which are interconnected by a cross bar which underlies clutch element 70. Bail arm 90a includes a stop finger 90c adapted to rock into and out of engaging position relative to stop 70f or 70g on clutch member 70e, finger 90c normally lying in non-engaging position. Bail arm 90b has a slot 90d formed in the free end thereof which pivotally and slidably receives a pin 91 secured to one arm 92 of a bail 93 pivotally secured to frame 10 by a pin 94. The other arm 95 of bail 93 is secured to clutch bar 40 so that movement of the bar rocks bail 93 which in turn, by reason of the pin and slot connection 91–90d rocks bail 90. Thus assuming depression of an alpha-numerical key, clutch bar 40 will be moved downwardly as described above. This motion will be transferred through bails 93 and 90 to stop arm 90c to rock the arm into stop engaging position. Stop 70f is so arranged with respect to the top of stop arm 90c that when the stop arm is in stop engaging position, the abutment surfaces of the arm and stop are angularly spaced a slight amount, for example about three degrees. Accordingly if arm 90c is in stop engaging position by virtue of depression of an alpha-numerical key to initiate a printing cycle and the space bar is depressed, before completion of the printing cycle, to cause engagement of clutch 16, stop 70f can rotate only three degrees before engaging stop arm 90c, such engagement immediately resulting in disengagement of the clutch and thus preventing rocking of escapement lever 81 by lobe 71b.

Such engagement of clutch 16 results from downward movement of interposer finger 65a away from stop 70c on clutch element 70 with the parts in the position shown in FIGURE 2. The three degree movement of the clutch elements accordingly causes stop 70c to rotate clockwise three degrees likewise to a position wherein it overlies the end of interposer finger 65a (see FIGURE 2B) and accordingly prevents immediate return of the finger to clutch disengaging position. In other words, the space bar action initiated during a printing cycle is effectively stored awaiting completion of the printing stroke which occurs about 32 mil/sec. after initiation of the printing cycle. At this time in the cycle cam 47 (FIGURE 3A) has rotated about 220 degrees where its radius has decreased sufficiently for arm 48 to rock counterclockwise an amount sufficient to permit clutch bar 40 to raise enough to rock stop arm 90c (FIGURE 2) away from stop 70f. As described this results in re-engagement of clutch 16 causing initiation of the word spacing cycle. Thus the space bar action which was stored becomes effective to initiate the word spacing cycle.

If an alpha-numerical key is depressed during a word spacing cycle, the space clutch mechanism elements are operative in a manner to be presently described to permit its interposer 22 to be latched until completion of a word spacing cycle which occurs at 180 degrees rotation of clutch 16, it being recalled that shaft 73 is rotating at 600 r.p.m. as against 1200 r.p.m. for driver 31. However the printing cycle will not be initiated until the spacing cycle is almost completed. During the initial portion of the spacing cycle, on the order of 12.5 milliseconds, that the space interposer 65 is in the ball lock, no depression of an alpha numeric key is possible. When the space interposer 65 leaves the ball lock, which occurs when the by-pass arm 63 has been swung away from lever foot 60d by arm 81 (FIGURE 2A) and link 85, an alpha numeric interposer may be depressed to the extent that its lock blade 22k may enter the ball lock and its finger 22n may clear latch arm 37b of storage pawl 37, permitting the latter to latch the interposer. At this time however the latched interposer 22 can only depress the clutch bar 40 to an extent permitted by bails 90 and 93 conrolled by cam surface 70j which is not sufficient to initiate an alpha numeric clutch cycle. Hence, during the remainder of the space clutch cycle, since stop arm 90c (FIGURE 1) is riding the cam surface 70j of member 70 and accordingly, through bails 90 and 93, preventing full depression of the clutch bar 40, the alpha numeric interposer remains in storage condition. At the end of the space clutch cycle, which occurs when lobe 70 is engaged by control finger 65a, the stop arm 90c and bail 90 will have rocked sufficiently counterclockwise to permit the full depression of the alpha numeric clutch bar 40 to initiate an alpha numeric cycle as hereinabove described.

It will now appear that there has been provided an improved keyboard for a writing machine that attains the several objects set forth above in a thoroughly practical and efficient manner.

As different embodiments of the invention are possible and as many changes may be made in the embodiment disclosed, all without departing from the scope of the invention, it is to be understood that the foregoing should be interpreted as illustrative and not in a limiting sense.

I claim:

1. In a keyboard for a writing machine, in combination,
   a frame,
   a plurality of key levers pivotally mounted on said frame,
   an actuating finger on each of said levers,
   an interposer for each of said levers pivotally mounted on said frame beneath said levers respectively, and adapted to be engaged and pivoted by a key lever finger upon depression of its key lever,
   a horizontal fulcrum shaft mounted on said frame beneath said interposers,
   a horizontal clutch actuating bar movably mounted on said frame beneath said interposers,
   and means on said shaft operable upon downward pivotal movement of any one of said interposers to latch said one interposer and to effect clutch actuating movement of said bar.

2. In a keyboard for a writing machine, in combination,
   a frame,
   a plurality of key levers pivotally mounted on said frame,
   a plurality of interposers pivotally mounted on said frame beneath said key levers and movable between normal and pivoted positions and each adapted to be engaged and pivoted by its associated lever to initiate a printing cycle,
   a clutch activator movably mounted on said frame,
   means movably mounted on said frame independently of said interposers and adapted to move said activator and latch one of said interposers upon a predetermined minimum movement of said one interposer,
   and means independent of said interposers to move said movable means upon a predetermined minimum movement of one of said interposers.

3. Apparatus in accordance with claim 2 including means operatively associated with said movably mounted means and movable between hold and release positions for normally holding said movably mounted means against movement.

4. Apparatus in accordance with claim 3 wherein said movable means comprises an element carried by each of said interposers.

5. Apparatus in accordance with claim 3 wherein said movably mounted means comprises a pivotally mounted latch for each of said interposers and engageable with its interposer upon moveemnt thereof to lock said interposer in its moved position.

6. Apparatus in accordance with claim 2 including means for precluding movement of said movably mounted means until one of said interposers has been moved a predetermined distance.

7. Apparatus in accordance with claim 2 including locking means operative upon pivotal movement of one of said levers to preclude movement of any of the other levers.

8. Apparatus in accordance with claim 3 including means for locking an interposer in pivoted position after a preceding interposer has been moved back to its normal position but before the completion of the printing cycle initiated by pivoting said preceding interposer.

9. Apparatus in accordance with claim 2 including means adapted to engage an interposer that has been moved to its pivoted position and positively return it to its normal position.

10. In a keyboard for a writing machine, in combination,
   a frame,
   a depressable key lever pivotally mounted on said frame,
   an interposer mounted on said frame below said lever and engageable thereby, said interposer having an abutment surface located between its ends and being movable horizontally and vertically,
   a drive shaft rotatably mounted on said frame and having a pair of abutment members having abutment faces that are angularly displaced less than 180°, said abutment member faces being so arranged that during a single typing cycle said faces serially engage said abutment surface on said interposer and a portion of the bottom edge of the interposer adjacent its abutment surface first to move said interposer horizontally and then upwardly,
   and means operable upon downward movement of said interposer for effecting cyclic rotation of said shaft.

11. Apparatus according to claim 10 including means on said interposer for precluding operation of said operable means until said interposer has been moved downwardly a predetermined minimum distance by said lever.

12. Apparatus according to claim 10 wherein said operable means includes a wrap spring clutch connected to said shaft to rotate said shaft upon engagement, an arm pivotally mounted on said frame for normally holding said clutch disengaged, a lever pivotally mounted on said frame and engageable with said arm for moving it to clutch engaging position, and means effective upon downward movement of said interposer for pivoting said last mentioned lever into engagement with said arm to move it to clutch engaging position.

13. Apparatus according to claim 12 wherein one element of said clutch has a cam surface on which said arm rides after clutch engagement thereby to hold said arm out of clutch disengaging position for a substantial amount of one cycle of operation.

14. Apparatus according to claim 12 wherein one element of said clutch has a cam surface on which said arm rides after clutch engagement thereby to hold said arm out of clutch disengaging position for a substantial amount of one cycle of operation, and means on said interposer engageable with said last mentioned lever for moving said lever away from said arm upon upward movement of said interposer.

15. Apparatus in accordance with claim 2 including a plurality of superimposed permutation bails pivotally mounted on a common axis in the path of lateral movement of said interposers.

16. In a keyboard for a writing machine, in combination,
   a frame,
   a key lever pivotally mounted on said frame,
   an interposer mounted on said frame beneath said key for sequential movement from a normal position downwardly upon depression of said key lever, then laterally in one direction, then upwardly, then laterally in reverse direction to its normal position,
   a drive shaft rotatably mounted on said frame and having a pair of abutment members angularly spaced less than 180° and adapted to serially engage said interposer during one revolution of said shaft to move it in said one direction and then positively move it upwardly,
   means to move said interposer to its normal position,
   a clutch connected to said shaft to effect rotation thereof when engaged, and normally locked tripable means operated by said interposer upon downward movement to effect engagement of said clutch.

17. In a keyboard for a writing machine, in combination,
- a frame,
- a pair of key levers pivotally mounted on said frame,
- a pair of interposers movably mounted on said frame below said levers respectively, each interposer adapted to be moved downwardly from its normal position upon depression of its associated key to initiate a printing cycle and each having a stop and latching finger,
- a clutch activator movably mounted on said frame,
- a bell crank pivotally mounted on said frame beneath each of said interposers and having a latching arm and an actuating arm engageable with said clutch activator, said latching arm normally resting against its interposer stop finger,
- a spring connected to each bell crank for biasing its actuating arm toward said clutch activator and its latching arm against its stop finger whereby upon depression of one of said interposers its stop finger is moved away from its latching arm into position to be latched by its latching arm and its actuating arm is moved against said clutch activator to initiate a printing cycle,
- and cyclically operable means for returning said depressed interposer to its normal position during the printing cycle whereby said other interposer can be depressed and latched in its downward position thereby to store the signal that initiates the following printing cycle.

18. Apparatus in accordance with claim 17 wherein each related latching finger and latching arm are so positioned and arranged as to preclude latching operation and clutch activator movement without downward interposer movement of predetermined minimum amount.

19. In a keyboard for a writing machine, in combination,
- a frame,
- a pair of key levers pivotally mounted on said frame,
- a pair of interposers movably mounted on said frame in operative relationship to said levers respectively and each movable to active position in response to manipulation of its associated lever,
- a clutch activator movably mounted on said frame,
- an integral latching and triggering member movably mounted on said frame and responsive to movement of an interposer to latch such interposer in active position and trigger said clutch activator into activating position,
- and means responsive to operation of said clutch activator to positively drive an interposer from its latched position and toward normal position whereby the other interposer can be latched in active position thereby to store a signal that initiates the following printing cycle.

References Cited by the Examiner

UNITED STATES PATENTS

| | | | |
|---|---|---|---|
| 2,236,413 | 3/41 | Pirnat et al. | 197—107 |
| 2,875,880 | 3/59 | Palmer | 197—17 |
| 2,879,876 | 3/59 | Palmer et al. | 197—16 |
| 2,919,002 | 12/59 | Palmer | 197—16 |
| 2,978,086 | 4/61 | Hickerson | 197—98 X |
| 3,086,635 | 4/63 | Palmer | 197—16 |

ROBERT E. PULFREY, *Primary Examiner.*